Sept. 8, 1953  G. E. STILWELL  2,651,036
AUTOMATIC LIDDER FOR BOXES VARYING IN LENGTH
Filed April 5, 1950  7 Sheets-Sheet 1

FIG. 1

INVENTOR
GLENN E. STILWELL
BY
ATTORNEY

Sept. 8, 1953 G. E. STILWELL 2,651,036
AUTOMATIC LIDDER FOR BOXES VARYING IN LENGTH
Filed April 5, 1950 7 Sheets-Sheet 2

INVENTOR
GLENN E. STILWELL
BY
ATTORNEY

Sept. 8, 1953     G. E. STILWELL     2,651,036
AUTOMATIC LIDDER FOR BOXES VARYING IN LENGTH
Filed April 5, 1950     7 Sheets-Sheet 3

INVENTOR
GLENN E. STILWELL
BY
ATTORNEY

Sept. 8, 1953  G. E. STILWELL  2,651,036
AUTOMATIC LIDDER FOR BOXES VARYING IN LENGTH
Filed April 5, 1950  7 Sheets-Sheet 5

INVENTOR
GLENN E. STILWELL
BY
ATTORNEY

Sept. 8, 1953  G. E. STILWELL  2,651,036
AUTOMATIC LIDDER FOR BOXES VARYING IN LENGTH
Filed April 5, 1950  7 Sheets-Sheet 6

INVENTOR
GLENN E. STILWELL
BY
ATTORNEY

Sept. 8, 1953  G. E. STILWELL  2,651,036
AUTOMATIC LIDDER FOR BOXES VARYING IN LENGTH
Filed April 5, 1950  7 Sheets-Sheet 7

INVENTOR.
GLENN E. STILWELL
BY
ATTORNEY

Patented Sept. 8, 1953

2,651,036

UNITED STATES PATENT OFFICE 2,651,036

AUTOMATIC LIDDER FOR BOXES VARYING IN LENGTH

Glenn E. Stilwell, Riverside, Calif., assignor to Food Machinery and Chemical Corporation, San Jose, Calif., a corporation of Delaware Application April 5, 1950, Serial No. 154,119

11 Claims. (Cl. 1—10)

This invention relates to the nailing machine art and particularly to the art of nailing lids onto wooden boxes.

Lidding machines have heretofore been in common use for nailing lids on boxes, but each such machine was adapted for lidding boxes of only one length. Certain lidding machines are made adjustable so that they may be altered to lid boxes of different lengths, but this alteration consumes so much time that a single machine may not be practically used for lidding a series of boxes, certain of which are of one length and others of which are of a substantially different length.

It is an object of this invention to provide a lidding machine which is adapted to receive a series of boxes varying in length and nail the lids onto these without requiring any adjustment of the lidder.

It is another object of the invention to provide such a lidder which is automatic in its operation so that the attention of an operator is not required in order for the machine to perform its function of lidding each of the boxes in said series.

The work done by nailing machines, as in the making of a box and in some cases in lidding the same, requires that a series of nailing cycles be performed by the machine in a given sequence after which the machine must be in condition to perform the first of a second like series of operations in repeating this performance. Not infrequently a different pattern of nails is required to be driven in one of the cycles of the series just referred to than is required in others of said cycles in said series.

Mechanisms have been devised to feed nails to a nailing machine which feed the proper number of nails to the chucks of the machine just prior to each of the nail driving cycles. The most common of these mechanisms includes what is known as a nail picker shaft which rotates only a portion of a revolution for each nail driving cycle of the nailing machine, and during that partial revolution delivers nails to the chucks in the proper number and disposition to serve the needs of the next nailing cycle in the sequence being followed by this machine.

Other control functions besides the feeding of nails are necessary in order to effect the proper performance of the nailing machine in each of the nailing cycles. These other control functions have to do with handling the work and placing it in proper position with relation to the nailing machine so that when the next nailing cycle takes place the nails will be driven into the work in the proper locations as required in that nailing cycle. Heretofore means entirely separate from the nail picker shaft have been employed for controlling the arrangement of the work in proper order prior to each nailing cycle for the latter to be effective for its desired purpose.

It is an object of my invention to simplify the provision of controls for ordering the work in a nailing machine by utilizing the nail picker shaft as a coordinating factor in the operation of such controls.

The manner of accomplishing the foregoing objects, as well as further objects and advantages will be made manifest in the following description taken in connection with the accompanying drawings in which.

Referring specifically to the drawings, the automatic lidder 15 illustrated therein includes a base 16 on which is mounted an electric motor 17, and which bears standards 18 having suitable bearings in which a main crank shaft 19 journals. The shaft 19 is provided with cranks 20 and is adapted to be rotated a single revolution at a time by the motor 17 through a suitable clutch transmission, the details of which are not illustrated, as they are well known in the art, and which is controlled by depression of a clutch pedal 21. This clutch pedal may be depressed by the foot of the operator when it is desired to operate the lidder 15 semi-automatically, but this pedal is provided with a solenoid 22 for actuating the same automatically when this is preferable.

Fixed on the standards 18 are angle iron cross members 23 on which are mounted side frame members 24 of a power driven box feed conveyor 25.

The conveyor 25 includes a drive shaft 30 which is driven by a geared motor 31 and which has sprockets 32 which are connected by endless chains 33 to sprockets 34 mounted on an idle conveyor shaft 35, opposite ends of which journal in bearings 36 which are longitudinally adjustable on the members 24.

Figure 17:
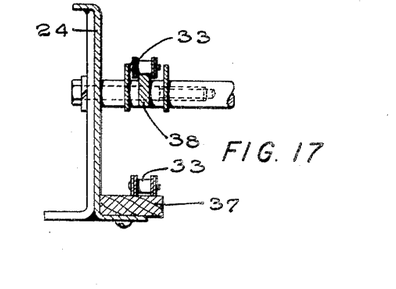
Fig. 17 is a sectional detail taken on line 17—17 of Fig. 15.
Figure 18:
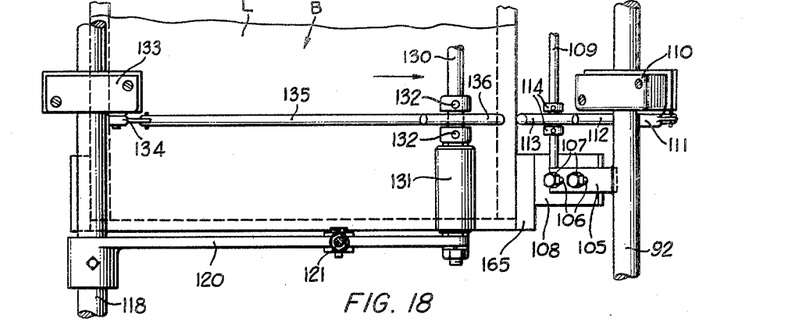
Fig. 18 is a view similar to Fig. 9 and shows a box related to the control mechanism as when positioned for the second nailing operation in the lidding of said box, as illustrated in Fig. 8.
Figure 19:
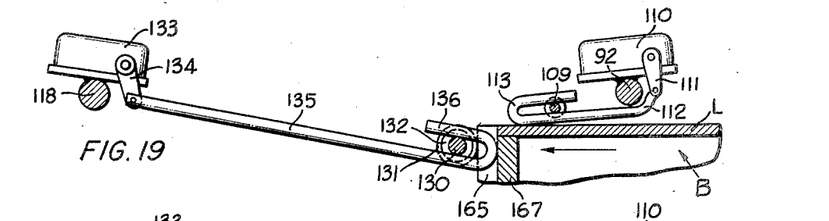
Fig. 19 is a fragmentary vertical sectional view taken on the line 19—19 of Fig. 9.
Figure 20:
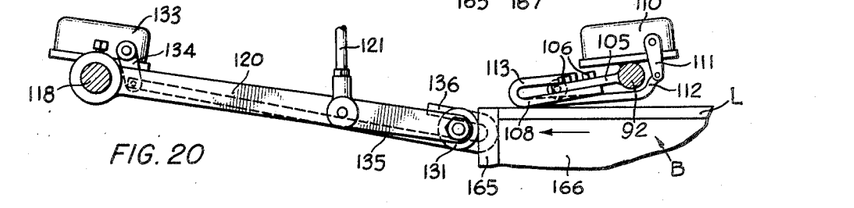
Fig. 20 is a fragmentary vertical sectional view taken on the line 20—20 of Fig. 9.
Figure 21:
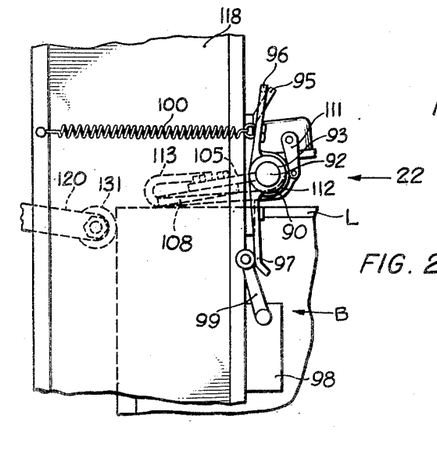
Fig. 21 is a fragmentary enlarged elevational view of a middle portion of Fig. 6.
Figure 22:
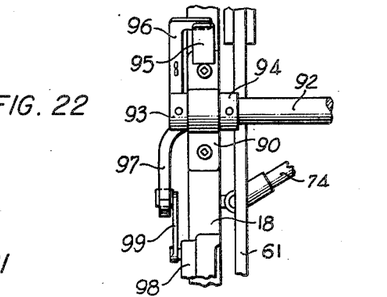
Fig. 22 is an elevational view of Fig. 21 taken in the direction of the arrow 22.

The lower flights of chains 33 ride on wooden tracks 37 mounted on the members 24 and the upper flights of said chains ride on metal tracks 38, also mounted on said members (Fig. 17). Pivoted on a shaft 39, opposite ends of which journal in bearings 40 which are mounted for vertical adjustment on the members 24, is an idle anvil roller 41.

Mounted on a rocker 42 is a pair of flanged rollers 43 which are movable vertically in gaps 44 in the chain tracks 38 and are yieldably held upwardly in supporting relation with the upper flights of the chains 33 by springs 45 connected to arms 46 of said rocker and to the conveyor frame members 24. The rollers 43 thus hold the chains 33 in contact with boxes being delivered over the anvil roller 41 even though the major portion of the weight of said boxes may be resting on said anvil roller 41, thus enabling the chains to continue to feed such a box along the conveyor 25.

The upper ends of standards 18 are joined together by cross members 50 and 51 by a nail feed mount 52. Fixed on the mount 52 are brackets 53 which provide bearings for a nail picker shaft 54 which is rotated 90° during each nailing operation by a ratchet device 55 which is connected by a link 56 with a nail driver head 57 which is slidable vertically in slots 58 provided in upper end portions of the standards 18. Pivotally connected to trunnions 59 formed on the driver head 57 are pitmen 60, lower ends of which are pivotally connected to the cranks 20 so that each single revolution of shaft 19 results in a vertical reciprocation of the driver head 57.

Also vertically slidable on the standards 18 and supported on cam follower links 61 is a chuck mounting head 62. This carries chucks 63 which are penetrated by drivers 64, mounted on the driver head 57. The chuck head 62 is lowered and elevated during each nailing operation, in a manner well known in the art, by cams (not shown) provided on the shaft 19 and which transmit motion to the head 62 through the links 61.

Figure 3:
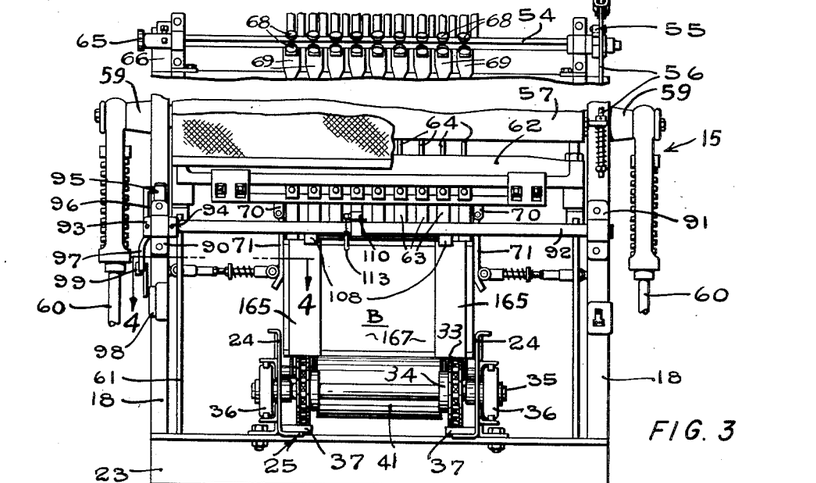
Fig. 3 is a view similar to Fig. 2 illustrating the lidding machine in the moment of finally driving nails through an end of the lid and into the box with the lid flushers in closed or lid flushing positions.
Figure 4:
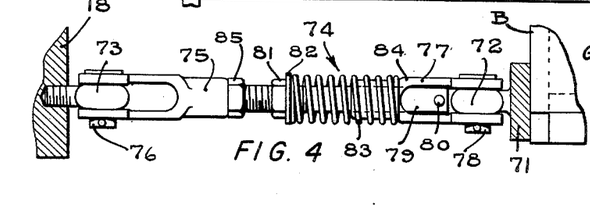
Fig. 4 is an enlarged fragmentary sectional view taken on the line 4—4 of Fig. 3 and illustrates in plan the yieldable flusher pressing link.

Fixed on the shaft 54 is a cam 65 (Figs. 1 and 3) which has two diametrically opposite high portions. Provided on the mount 52 is a switch 66, the roller arm 67 of which is disposed close to cam 65 so the latter actuates said switch with each quarter turn of the shaft 54.

The shaft 54 is square (Fig. 3) and each face thereof carries rollers 68 which function with each quarter revolution of shaft 54 to actuate individual nail picking devices (not shown) in a manner well-known in the art to deliver nails into funnels 69 which are connected, respectively, by flexible metal hoses (not shown) with the chucks 62. The nails thus picked during each nailing cycle gravitate into the chucks 62 at the close of that cycle and are thus driven into the work in the next following nailing cycle. A disclosure of a nail picking device suitable for use in the present invention may be found in U. S. Letters Patent No. 1,409,801 issued March 14, 1922, to H. E. Twomley.

Pivotally supported at their upper ends on ears 70 which are provided on the chuck head 62 is a pair of lid flushers 71. Near their lower ends these lid flushers have eyes 72 while similar eyes 73 are provided on the frame standards 18 on substantially the same level therewith. The eyes 72 and 73 are connected by spring links 74, each of which includes a threaded clevis 75 which is pivotally connected to the eye 73 by a pin 76 and a smooth clevis 77 which is pivotally connected to the eye 72 by a pin 78. Extending into the smooth bore of the clevis 77 is a rod 79 having a cross pin 80 which prevents the withdrawal of said pin from said clevis but allows about an inch of free play longitudinally therein.

The opposite end of the rod 79 is threaded to receive a nut 81 and washer 82, and a coiled spring 83 is trapped between the shoulder 84 of the clevis 77 and the washer 82. Also screwed onto the rod 79 is a lock nut 85 which is used to lock this rod to the clevis 75 when said rod has been screwed into said clevis to produce a desired adjustment in length of the link 74.

Provided on the standards 18 (Figs. 1, 2 and 3) are bearings 90 and 91 in which is journalled a shaft 92 having collars 93 and 94 fixed thereto on opposite sides of the bearing 90 to prevent endwise movement of said shaft.

Figure 1:
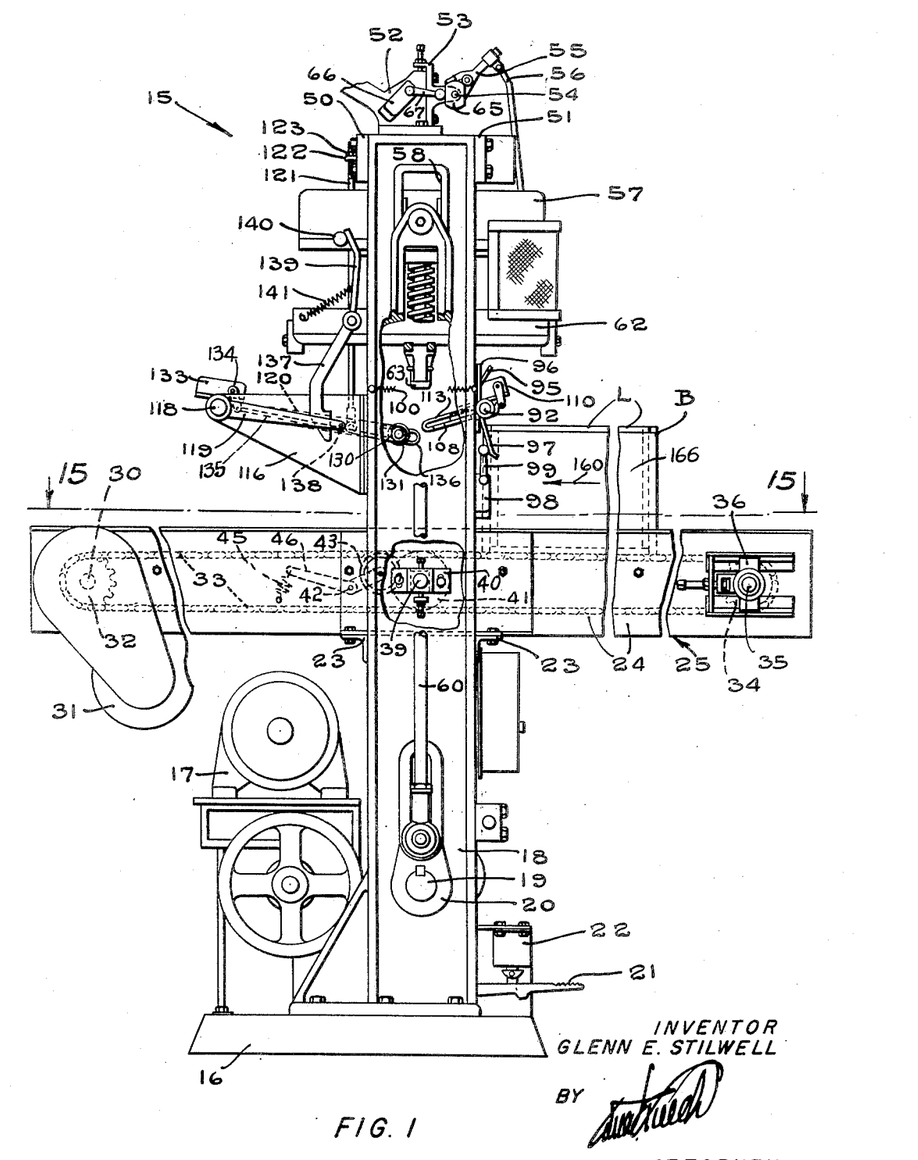
Fig. 1 is a side elevational view of a preferred embodiment of the invention, portions of which are broken away to illustrate certain details otherwise hidden, and in which a box is shown carried on the feed conveyor of the lidder and approaching the lidder with a lid positioned on the top of the box in readiness to be nailed thereto.
Figure 2:
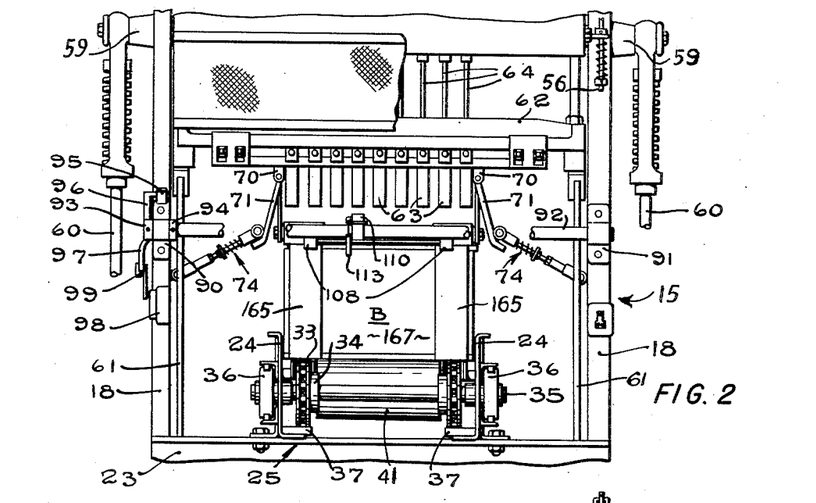
Fig. 2 is a fragmentary front elevational view of the lidder shown in Fig. 1, with portions thereof broken away to illustrate the lid flushers in their normal expanded condition.

The bearing 90 has a stop lug 95 extending upwardly and outwardly therefrom. Formed on the collar 93 to extend upwardly and downwardly respectively therefrom are arms 96 and 97 (Figs. 1, 2, 3, 6 and 7). The upper end of the arm 96 turns inwardly so as to lie between the stop 95 and the adjacent standard 18 and thus limits rotation of shaft 92 to an angle of approximately 20°. Mounted on the standard 18 carrying the bearing 90 and just below said bearing is a switch 98, the control arm 99 of which is disposed close to and in the plane of rotation of the arm 97 (Figs. 1 and 2).

Figure 8:
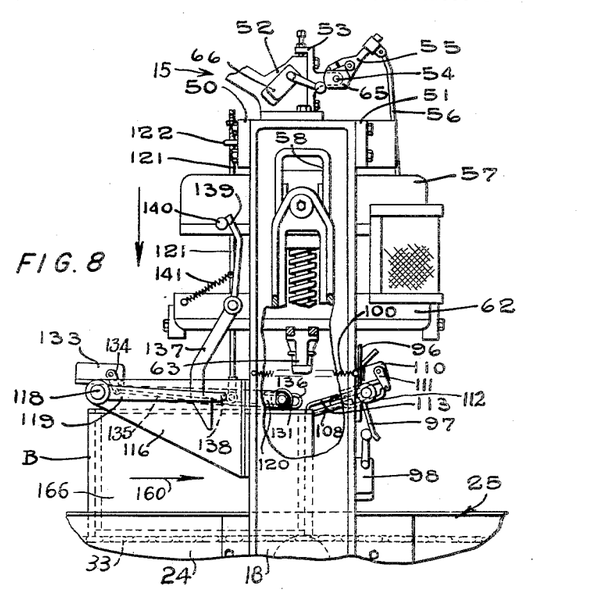
Fig. 8 is a view similar to Fig. 7 and illustrates the return rearwardly of the box shown in Figs. 6 and 7 at the moment when it engages the rearward motion stop and actuates the switch causing the nailing machine to drive nails through the rear edge of the lid and into the box.

Connected at one end to the arm 96 and at its other end to the far side of the adjacent standard 18 is a coiled spring 100 which tends to constantly rotate the arm 96 into engagement with said standard 18 as shown in Figs. 1 and 8.

Welded on the shaft 92 (Fig. 9) and extending forwardly and downwardly therefrom is a pair of stop mounting lugs 105 having slots 106 through which cap screws 107 extend to adjustable secure reversed box stops 108 to the lower faces of the lugs 105. Welded to and connecting the lower ends of the lugs 105 is a guide rod 109.

Mounted on the shaft 92 (see Figs. 1, 2, and 9) is a switch 110 having a switch arm 111, to the lower end of which a rod 112 pivotally connects. The rod 112 extends downwardly and forwardly underneath the rod 109 and is bent back on top of the latter to form a switch actuator 113 which is slidable on rod 109 between two collars 114 provided on the latter.

Provided on the opposite side edges of the standards 18 from the bearings 90 and 91 are brackets 116 having bearings 117 in which a shaft 118 is journalled. Fixed on the shaft 118 is an arm 119 which is disposed just outside one of the brackets 116 and arms 120 which are disposed within said brackets. Pivotally connected at its lower end to each of the arms 120 is a limit stop rod 121 (Fig. 1), the upper end of which passes through an aperture in a lug 122 provided on the cross member 50 of the frame of the machine and receives nuts 123 to adjustably determine the lowermost position to which the arms 120 are permitted to swing.

Connecting the inner ends of the arms 120 is a small diameter shaft 130 carrying stop rollers 131 near its opposite ends and a pair of spaced collars 132 adjacent one of said rollers. Mounted on the shaft 118 is a switch 133 having a switch arm 134, the lower end of which is pivotally connected to a rod 135 which extends inwardly beneath the shaft 130 and is bent back to overlie said shaft between the collars 132 to form a switch actuator 136.

Pivotally mounted on the chuck head 62 is a hook 137 which is adapted to hook around a pin 138 extending inwardly from the arm 119 (Fig. 9) when said hook is free to do so. Formed on and extending upwardly from said hook is a control cam 139 the engagement of which with a pin 140 provided on the driver head 57 controls the operation of the hook 137. Connected to the cam 139 and to the chuck head 62 so as to continually maintain the cam 139 against the pin 140 is a coil spring 141.

The lidder 15 has an electric wiring system 145 which is shown in various steps of the operation of the machine in Figs. 10 to 14 inclusive. From these views, it may be seen that switch 66 is a double pole switch including a normally open switch 66a and a normally closed switch 66b. Switch 98 is of a similar type having a normally open switch 98a and a normally closed switch 98b.

Electricity is supplied to the control circuit 145 through main leads L1 and L2. Lead L1 connects through a shut off switch 146 to one end of each of the reverse and forward magnetic switch coils R and F of the conveyor motor 31 and to one side of solenoid 22. Lead L2 connects to one side of each of the switches 66b, 98b, 98a, 110 and 133. A wire 147 connects the other sides of forward switch coil F, switch 66b, and switch 98b.

A wire 148 connects the other side of switch coil R to one side of switch 66a. A wire 149 connects the other side of switch 66a to the other side of switch 98a. A wire 150 connects the other sides of switches 110 and 133 through a shut off switch 151 to the other side of the solenoid 22.

Operation

When commencing to operate the lidder 15, the cam 65 is in upright position as shown in Fig. 1 and the switch coil F is thus energized through switch activating arm 67 to start the motor 31 to drive the conveyor 25 in a forward direction so as to carry a box B which may be placed on the conveyor, with a lid L in place thereon, in the direction of the arrow 160. Assuming the switch 151 to be closed so as to cause the machine to nail automatically without the necessity of the operator manually depressing the pedal 21, the operation of the machine 15 in lidding box B may be described as follows:

It is to be noted that box B, which is of the type on which the particular machine 15 was designed to work, has vertical end cleats 165 which position the lid L endwise of the box by virtue of the fact that these cleats extend above the upper edges of the sides 166 and heads 167 of the box.

The lid L is resting loosely on the box when the latter is traveling into the machine as shown in Fig. 1.

Figures 5, 6, 7:
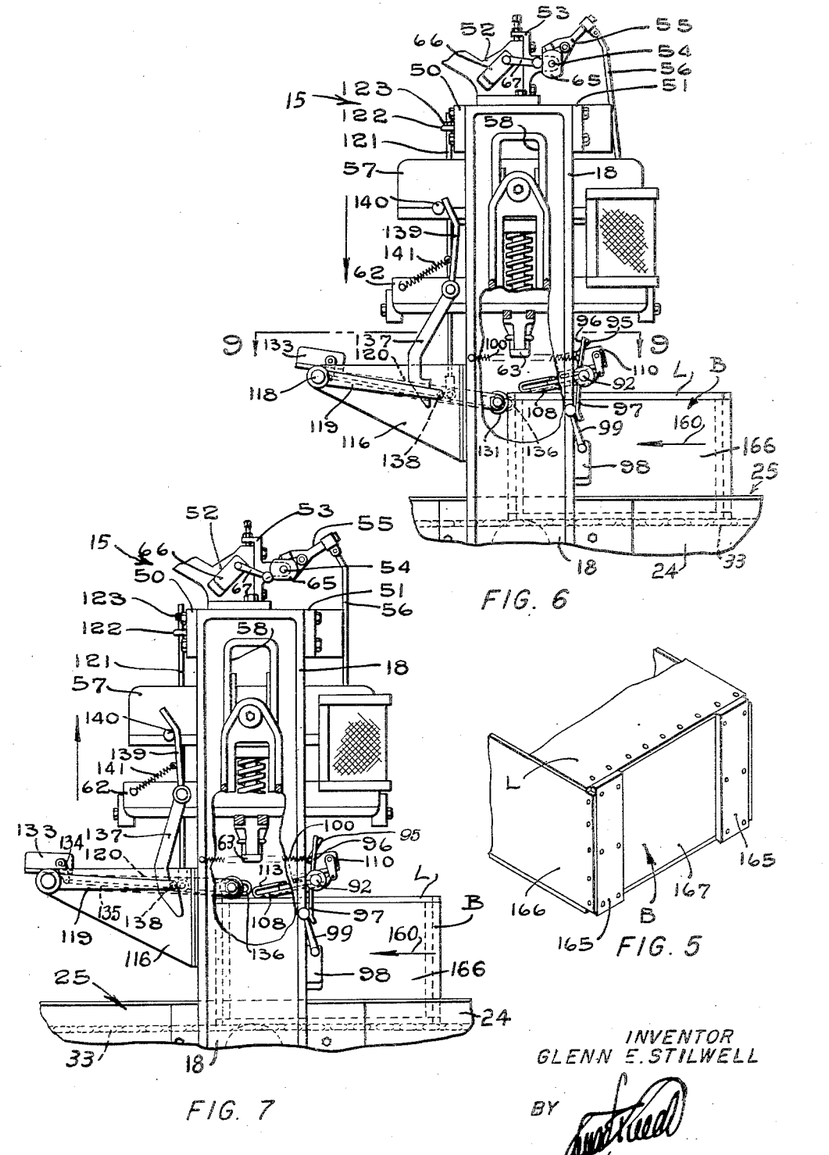
Fig. 5 is a fragmentary perspective view of one of the boxes which the invention is adapted to lid.
Fig. 6 is a fragmentary side elevational view similar to Fig. 1 and illustrates a moment in a cycle of operation when an incoming box has just engaged the forward motion stop and actuated the switch which causes the nailing machine to drive nails through the forward edge of the lid and into the box.
Fig. 7 is a view similar to Fig. 6 and illustrating a moment in the lidding cycle which follows the nailing operation, the start of which is illustrated in Fig. 6 and with the nailing head rising and lifting the forward motion stop permitting the box to be propelled underneath this in preparation for the second nailing operation involved in lidding said box.
Figure 9:
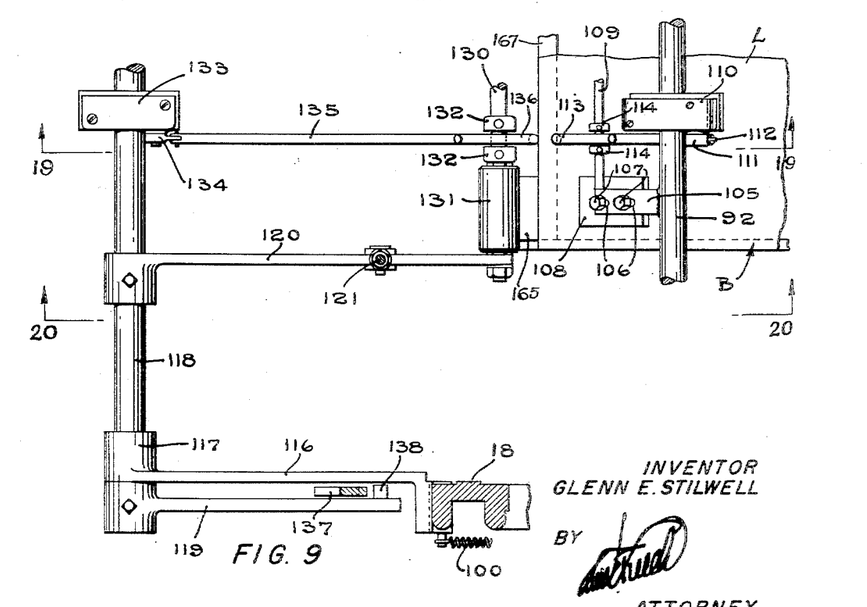
Fig. 9 is an enlarged fragmentary horizontal sectional view taken on the line 9—9 of Fig. 6.
Figure 10:
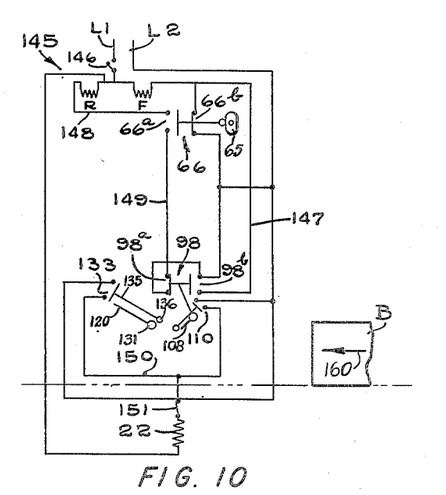
Fig. 10 is a wiring diagram of the electrical system of the invention in the condition in which it is with the machine as illustrated in Fig. 1, which is to say, with a box approaching the lidder on the feed conveyor.
Figure 11:
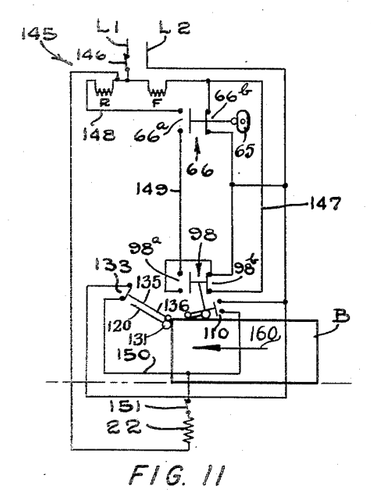
Fig. 11 is a view similar to Fig. 10 at the moment in a lidding cycle as illustrated in Fig. 6.

As the box enters the machine, the leading end of the box engages the reverse stops 108 and swings these upward so as to permit the box to pass thereunder, whereupon the front end of the box engages stop rollers 131 and switch actuator 136 (as shown in Figs. 6, 9, and 11) whereby the front end of the box is properly positioned in the lidder 15 to have the front end of the lid nailed to a head 167 at the front end of the box. The box is retained in this position by the stop rollers 131 while the conveyor chains 33 continue to travel beneath the box in sliding contact with the same.

When thus positioned the front end of the box is directly over the anvil roller 41. Actuation of the switch 133 by the box engaging the actuator 136 energizes the solenoid 22 as shown in Fig. 11 whereupon the solenoid depresses the pedal 21 and causes a single revolution of the shaft 19 which nails the leading end of the lid onto the front head 167 of the box B. This is shown as starting to take place in Fig. 6. The driver head 57 and chuck head 62 are shown in this view just as they start downward to perform the nailing operation.

When the chucks 63 come to rest on the lid of the box, the chuck beam 62 from which these are suspended, halts in its downward movement and the driver head 57 continues downward to drive nails from the chucks through the lid and into the box head therebeneath. This decrease in the distance separating the chuck head 62 and driver head 57 changes the position of the pin 140 relative to the cam arm 139 permitting the hook 137 to be swung under the pin 138 by the spring 141 as shown in Fig. 7.

The cams which operate the chuck supporting head 62 return this head upwardly immediately following a nailing operation at the same time the driver head 57 starts to rise. The hook 137 therefore continues to be held under the pin 138 by the spring 141, as the chuck head thus rises, and lifts pin 138, swinging the rollers 131 upwardly above the upper edge of the box B as shown in Fig. 7 thereby permitting the friction of the continuously forwardly operating conveyor to propel the box underneath the rollers 131.

Immediately upon the chuck and driver heads having returned to their normal spaced positions as shown in Fig. 1, the pin 140 swings the hook 137 out from beneath the pin 138 thereby permitting the rollers 131 to drop downwardly on top of the box B as shown in Fig. 7.

Figures 12, 13:
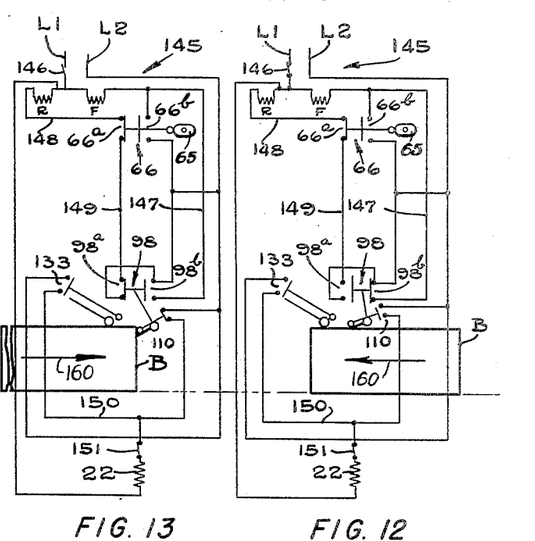
Fig. 12 is a view similar to Fig. 11 at the moment in a lidding cycle illustrated in Fig. 7.
Fig. 13 is a view similar to Fig. 12 at the moment in a lidding operation illustrated in Fig. 8.

The lifting of the rollers 131 out of the way of the box B releases the switch actuator 136 from the pressure of the box thereagainst and permits switch 133 to open (as shown in Fig. 12).

Box B thus resumes its travel forwardly, passing under the rollers 131 and eventually out from under the reverse stops 108 and switch actuator 113. This permits the shaft 92 to be swung by its spring 100 to project the stops 108 and actuator 113 downwardly behind the box B thereby actuating the switch 98 to open the switch 98b and close the switch 98a. The circuit of the forward switch coil F is thereby opened and the circuit of the rearward switch coil R closed, as shown in Fig. 13, which reverses the conveyor 25 and returns the box B against the stops 108 and the switch actuator 113 so as to halt the box in position for nailing the rear edge of the lid thereof to the rear head of the box and to close switch 110 to bring about the actuation of the lidder 15 to perform this nailing operation.

Figure 14:
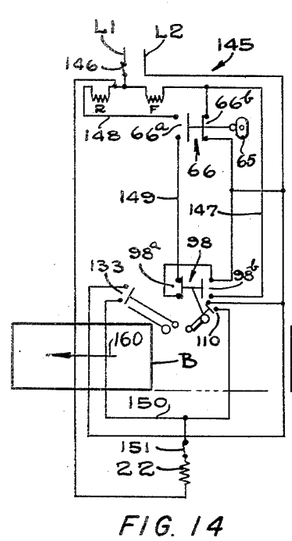
Fig. 14 is a view similar to Fig. 13 immediately following the conclusion of a lidding cycle and with a completely lidded box traveling away from the lidder.
Figure 15:
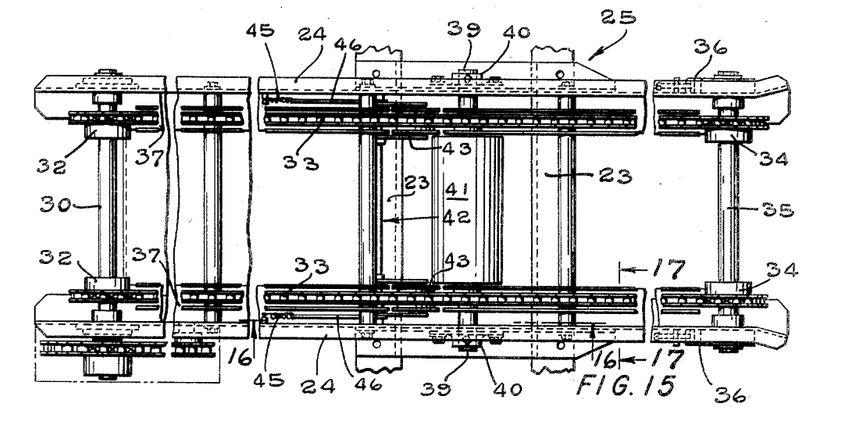
Fig. 15 is an enlarged plan of the feed conveyor taken on line 15—15 of Fig. 1.
Figure 16:
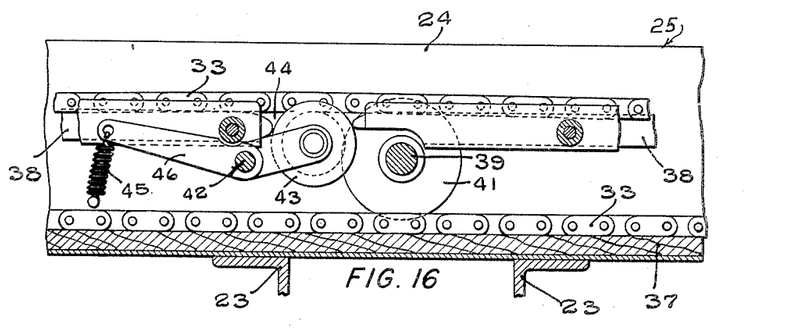
Fig. 16 is an enlarged longitudinal section taken on line 16—16 of Fig. 15.

The rotation of the nail feed shaft 54 through a 90° angle with this nailing operation rotates the cam 65 to return the switch 66 to its beginning position as shown in Fig. 14 thereby instantly breaking the circuit of the reverse switch coil R and closing the circuit of the forward switch coil F thereby immediately reversing the motor 31 and removing the box B from engagement with the switch actuator 113 so that switch 110 is opened before the completion of the nailing cycle of the lidder 15 so as to de-energize the solenoid 22 in time to prevent a repetition of the nailing cycle.

With the resumption of forward travel in the conveyor 25, the box B is conveyed in a leftward direction, as shown in Fig. 14, out of the lidder 15.

From the above description it is clear that boxes B of assorted lengths but having the same cross section, may be fed into the lidder 15 promiscuously and each of these boxes will be lidded by a succession of two nailing operations, each of which will be automatically located so as to nail first the forward end and then the rear end of the lid to the adjacent heads of the box. It is also believed evident that the services of an operator for the lidder 15 excepting to exercise general supervision and see that the boxes are all supplied with lids, may be dispensed with.

If at any time it is desirable to control the lidder 15 so that it will perform a nailing operation only as directed by manual control, this may be accomplished by opening the switch 151 whereupon the lidder 15 will perform a nailing operation only when the operator tromps upon the pedal 21. The advancing of each box onto the lidder in the proper position to have the front end of the lid nailed thereto, the automatic further advancing of the box after that nailing operation has been performed, the automatic returning of the box into a proper position to have the rear end of the lid nailed thereto, and the automatic resumption of the forward travel of the box on the conveyor following the second nailing operation are still all automatically accomplished without the necessity of any human intervention in the operation of the machine.

It is, of course, to be understood that, in its broader aspects, the present invention embraces a subcombination which could exclude the power actuated feature of conveyor 25 and which might be usefully employed by manually feeding the boxes B into the lidder by manually sliding these along the top of the conveyor 25 into the position in which box B is shown in Fig. 6 for performing the first nailing cycle of the lidding operation. Following this cycle, which concludes with the automatic lifting of the forward stop rollers 131 above the top of the box B, the latter could be manually fed through the machine and manually reversed against the reverse stops 108 with the box positioned as shown in Fig. 8 for the second nailing cycle of the lidding operation. Following this the completely lidded box could be manually ejected from the machine. The manual mode of operation just described is, of course, not the preferable use of the invention, although in some instances where a limited capacity is no handicap and the emphasis is on low investment in equipment, this mode of operation might be employed.

I claim:

1. In a box lidder, the combination of: a nailing machine; a conveyor for conveying a box through said machine in a given direction lengthwise of said box but also adapted for conveying said box in a reverse direction; a forward motion stop for halting said box on said conveyor in position for nailing the front edge of a lid onto the front end of said box; means for setting said nailing machine in motion to cause it to nail the front edge of said lid to the front end of said box; means responsive to said nailing operation to remove said stop from in front of the front end of said box to permit said box to continue traveling in said direction on said given conveyor until past nailing machine; and a reverse stop mounted on said nailing machine to yield out of the path of said box when the latter is traveling in the aforesaid given direction into said machine, but located to engage the rear end of said box when said box is conveyed in said reverse direction after having passed beyond said nailing machine and said reverse stop, said box being positioned by engagement with said reverse stop so that actuation of said nailing machine nails the rear edge of said lid to the rear end of said box.

2. A combination as in claim 1 in which said conveyor is power driven; means responsive to said box traveling in a forward direction beyond said reverse stop to reverse said conveyor to return said box until its rear end contacts said reverse stop; and means responsive to the nailing of the rear edge of said lid to the rear end of said box to again reverse said conveyor to cause said box to resume its forward travel thereby discharging said box from said machine.

3. A combination as in claim 2 having a switch which is closed by alternate operations of said nailing machine, and a switch which is closed by said box moving in a forward direction out of contact with said reverse stop, and in which said first conveyor reversing means is responsive to the simultaneous actuation of said switches.

4. A combination as in claim 1 in which said conveyor is power driven; means responsive to said box traveling in a forward direction beyond said reverse stop to reverse said conveyor to return said box until its rear end contacts said reverse stop; means responsive to the nailing of the rear edge of said lid to the rear end of said box to again reverse said conveyor to cause said box to resume its forward travel, thereby discharging said box from said machine; and means associated with each of said stops and responsive to the final movement of said box into engagement with said stop to start said nailing machine to cause the latter to nail said lid to the end of said box which is in engagement with said stop.

5. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: a cam provided on said nail picker shaft; an electric switch actuated by said cam upon a given partial rotation of said shaft; and work feed means responsive to the actuation of said switch by said cam in a given nailing cycle to deliver work into a given position required for the proper driving of nails into said work during the next succeeding nailing cycle of said machine.

6. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: a cam provided on said nail picker shaft; an electric switch actuated by said cam upon a given partial rotation of said shaft; work feed means for delivering work successively into and out of a nailing position in said machine; and means connecting said switch to said work feed means to render the position given said switch by said cam selective as to whether the feed movement given the work by said feed means is into or out of said nailing position.

7. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: a cam provided on said nail picker shaft; an electric switch actuated by said cam upon a given partial rotation of said shaft; work feed means for delivering work into a given nailing position in said machine following a given nailing cycle; and means connecting said switch with said feed means whereby the position given said switch by said cam by said nailing cycle produces a feeding action by said work feed means which accomplishes the delivering of said work into said nailing position.

8. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: a cam provided on said nail picker shaft; an electric switch actuated by said cam upon a given partial rotation of said shaft; means for discharging work from said machine; and means connecting said switch with said discharge means whereby the position given said switch by said cam by a given nailing cycle produces a discharge action by said discharge means which accomplishes the discharging of said work from said machine immediately following said nailing cycle.

9. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: a cam provided on said nail picker shaft; an electric switch actuated by said cam upon a given partial rotation of said shaft; work feed means for discharging one piece of work from a nailing position in said machine following a given nailing cycle and for feeding a second piece of work into a nailing position in said machine following the discharge of said first piece of work; and means connecting said switch with said feed means whereby the position given said switch by said cam by said nailing cycle causes said feed means to produce the aforesaid discharging and feeding actions.

10. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: work feed means for moving a piece of work into a nailing position or out of a nailing position in said machine; and means responsive to a partial rotation of said nail picker shaft during a given nailing cycle to select which of the feed movements aforesaid is given the work by said feed means following said nailing cycle.

11. In a nailing machine arranged to accomplish a given task requiring a series of nailing cycles to be accomplished in a given sequence and having a nail picker shaft connected thereto to be given a partial rotation during each nailing cycle to accomplish the feeding of a selected number of nails to the chucks of said nailing machine to be used in the nailing cycle next following, the combination of: feed means for feeding work into a proper position in said machine to have nails driven thereinto during a given nailing cycle; and control means responsive to that partial rotation of said nail picker shaft by which it fed said nails to said chucks to cause said feed means to feed said work into said position to receive said nails in the nailing cycle next following.

GLENN E. STILWELL.

No references cited.